United States Patent [19]

Inoue

[11] Patent Number: 4,516,009
[45] Date of Patent: May 7, 1985

[54] CAPACITOR-TYPE HF POWER SUPPLY FOR ELECTRICAL MACHINING

[75] Inventor: Kiyoshi Inoue, Tokyo, Japan

[73] Assignee: Inoue-Japax Research Incorporated, Yokohama, Japan

[21] Appl. No.: 45,177

[22] Filed: Jun. 4, 1979

[30] Foreign Application Priority Data

| Jun. 14, 1978 | [JP] | Japan | 53-72446 |
| Jun. 16, 1978 | [JP] | Japan | 53-53446 |
| Jun. 21, 1978 | [JP] | Japan | 53-75117 |
| Sep. 20, 1978 | [JP] | Japan | 53-115449 |

[51] Int. Cl.³ ............................................. B23P 1/08
[52] U.S. Cl. .............................. 219/69 P; 219/69 C
[58] Field of Search ................ 219/69 P, 69 C, 69 M

[56] References Cited

U.S. PATENT DOCUMENTS

| 3,539,755 | 11/1970 | Inoue | 219/69 P |
| 3,581,044 | 5/1971 | Watari | 219/69 P |
| 3,596,038 | 7/1971 | Hockenberry | 219/69 P |
| 3,814,894 | 6/1974 | Bell, Jr. et al. | 219/69 P |
| 4,017,705 | 4/1977 | Bazhenov et al. | 219/69 C |

FOREIGN PATENT DOCUMENTS

| 1083953 | 6/1960 | Fed. Rep. of Germany | 219/69 P |
| 944977 | 12/1963 | United Kingdom . | |
| 1168610 | 10/1969 | United Kingdom | 219/69 P |
| 543482 | 3/1977 | U.S.S.R. | 219/69 P |

Primary Examiner—Clifford C. Shaw
Attorney, Agent, or Firm—Karl F. Ross; Herbert Dubno

[57] ABSTRACT

A capacitor-type power supply for electrical machining has a capacitor connected across a machining gap and in the region thereof while a high-frequency power generator is disposed at a location remote from the machining gap and provides a high-frequency electric power. A feeder connects the power generator with the capacitor to permit the capacitor to be charged with pulses of the high-frequency electrical power. The system permits the high-frequency source to be located distally from the machining gap.

18 Claims, 12 Drawing Figures

CAPACITOR-TYPE HF POWER SUPPLY FOR ELECTRICAL MACHINING

FIELD OF THE INVENTION

The present invention relates generally to a power supply for electrical machining and, more particularly, to a capacitor-type high-frequency power supply for use in electrical machining. The term "electrical machining" is herein intended to refer to electroerosion or electrical discharge machining (EDM), electrochemical machining (ECM), electrochemical-discharge machining (ECDM), electrochemical grinding (ECG), electrochemical-discharge grinding (ECDG), electrochemical-abrasive machining (ECAM) and includes electrospark deposition (ESD), arc welding and electrodeposition, all of which processes are per se well known in the art. Thus while the description is herein made primarily with reference to EDM, it should be understood that the invention is applicable the other electrical machining processes enumerated above as well.

BACKGROUND OF THE INVENTION

Machines designed to perform electrical machining are commonly equipped with a power supply for providing machining energy to a fluid-filled machining gap formed between a pair of electrodes, one of which may be a tool electrode and the other a workpiece. In EDM the power supply has been adapted to furnish the machining gap with machining energy in the form of high-frequency discrete pulses and the use of the high-frequency pulsed energy has been found to be highly effective in other electrical machining processes as well where smooth direct-current gives rise to machining difficulties or inefficiency. In conventional EDM and other machining power supply circuit arrangements, machining power pulses are produced in a unit (power supply unit) provided separately from the machine proper which carries mechanical components and the work vessel in which the machining gap is defined between the tool electrode and the workpiece. The separate power supply unit has been adapted to package in its cabinet all principal electrical components required to produce at its output a succession of unidirectional power pulses of a predetermined polarity relative to the tool electrode and the workpiece. In an attempt to obtain machining pulses of an increased peak current or amplitude required to attain an enhanced removal rate and efficiency, the power supply unit sometimes contains an energy-storage capacitor for recurrent charging and discharging; the output of the capacitor is connected to, and hence the power pulses outgoing from the unit are transmitted to, the machining gap by way of an elongated cable or line. As a consequence, stray resistance and inductance included in the cable or line impede transmission of the unidirectional electric power and act to cause a considerable loss of power and distortion of pulse waveform transmitted to the machining gap. It has, therefore, been unavoidable for the material removal to be undesirably limited, for the machining efficiency to be unsatisfactorily low and for the entire power unit to become excessively large and bulky in conventional electrical (discharge) machines. In effect, the conventional design of using an energy storage capacitor in electrical machining art has not been satisfactory to achieve its intended purposes and advantages.

OBJECTS OF THE INVENTION

It is, accordingly, a principal object of the present invention to provide an improved capacitor-type high-frequency power supply for electrical machining, which is compact and permits an increased machining efficiency to be obtained. A specific object of the invention is to provide a capacitor-type high-frequency power pulsing circuit for electrical machining which enables attainment of an increased machining rate for a given surface finish or a finer surface finish for a given machining rate.

SUMMARY OF THE INVENTION

These and other objects are attained, in accordance with the present invention, by a capacitor-type high-frequency power supply for electrical machining, which comprises: a capacitor connected across a machining gap in the vicinity thereof; a high-frequency power generator disposed remote from the machining gap for providing a high-frequency electric power at an output thereof; and a feeder for connecting the high-frequency power generator with the capacitor to permit the capacitor to be charged pulsively with the high-frequency electric power and to be discharged through the machining gap to produce machining pulses therein.

Specifically, the capacitor is connected so close to the machining gap that conductors connecting the capacitor with the gap are of a minimum length and have an inductance not greater than 1 $\mu$H and preferably, at most 0.5 $\mu$H.

Circuit means is preferably provided which is responsive to the voltage across the machining gap for rendering the output of the high-frequency power generator inoperative when the gap voltage exceeds a predetermined value and/or drops below a second predetermined value.

Preferably, the generator has an output voltage at least twice the voltage up to which the capacitor is charged for discharging.

The generator may have an output frequency in the range between 1 KHz and 5 MHz.

Preferably, the generator is adapted to provide pulse trains individually consisting of elementary pulses of a frequency in the range between 1 KHz and 5 MHz, the adjacent trains being separated by a cut-off interval, which may be variably adjusted in accordance with a desired machining condition and/or modified in response to the machining gap state in the course of a machining operation.

Preferably, the generator comprises input means for receiving a commercial alternating current, a rectifier for converting the commercial alternating current to a direct current, means for pulsing the direct current to produce a high-frequency alternating current or pulsed output at a frequency much higher than that of the commercial alternating current and a transformer for transforming the voltage magnitude of the high-frequency output to the aforementioned power at a desired level.

The circuitry preferably includes further a rectifier connected with the capacitor for rectifying the charging current therefor, the rectifier being mounted in the vicinity of the machining gap. Preferably, the rectifier has an output voltage at least twice the voltage up to which the capacitor is charged for discharging.

The circuitry may also include further a switch connected with the capacitor for controlling the discharge thereof through the machining gap, the switch being mounted in the vicinity of the machining gap.

The invention also provides a capacitor-type power supply for electrical machining, comprising: a plurality of capacitors connected in parallel with one another across a machining gap and preferably in the vicinity thereof; and a plurality of switches respectively connected in the discharging circuits of the capacitors to be discharged successively through the machining gap.

BRIEF DESCRIPTION OF THE DRAWING

In the description which follows, certain embodiments of the invention will be described, reference being made to the accompanying drawing in which.

SPECIFIC DESCRIPTION

Figure 1:
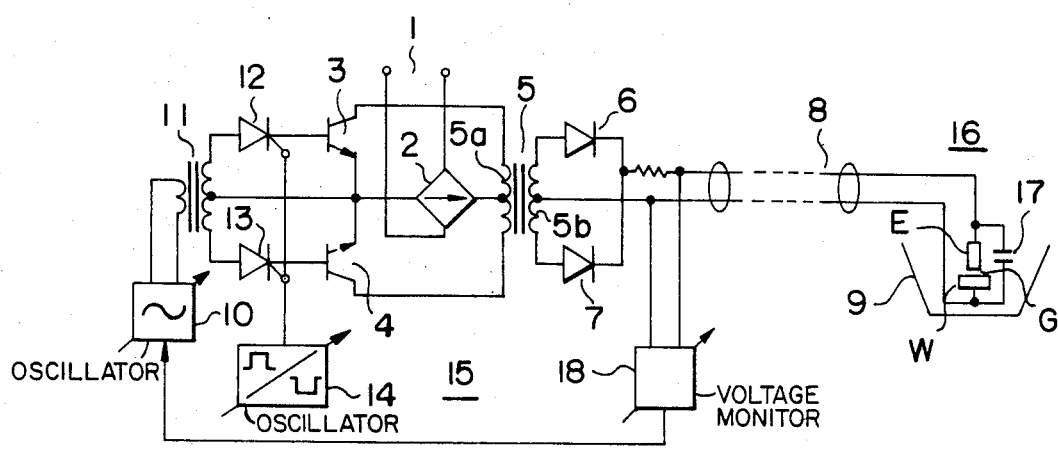
FIG. 1 is a circuit diagram illustrating an EDM power supply embodying the invention.

In FIG. 1 an electrical discharge machining (EDM) power supply circuit embodying the present invention is shown including input terminals 1 directly fed with a commercial alternating current (AC) and a full-wave rectifier 2 designed to provide a direct-current (DC) across its output terminals arranged across a pair of networks incorporating a pair of power switches 3 and 4, respectively and joined together at the primary winding 5s of a transformer 5. The switches 3 and 4, here shown comprising transistors, act to pulse the DC output at a high frequency and the resultant pulsed DC is accordingly applied bidirectionally across the primary winding 5a. The transformer 5 develops at its secondary winding 5b the high-frequency AC with a transformed voltage magnitude. The secondary winding 5b is provided with a rectifier arrangement including a pair of diodes 6 and 7 and led via a high-frequency feeder 8 to a machining electrode E and a workpiece W which form a machining gap G therebetween in a work tank 9. While the machining system is shown to use a sinking-type or solid electrode E, the electrode may be a wire electrode suitable to execute traveling-wire or wire-cut EDM.

A system for operating the switching transistors 3 and 4 comprises a high-frequency oscillator 10 whose high frequency output is applied upon transformation by a transformer 11, to the control circuits of the switches 3 and 4. The oscillator 10 has an operating frequency ranging between 1 KHz and 5 MHz. A pair of switches 12 and 13, here shown comprising thyristers, included in the control circuits of the switches 3 and 4 are operated by a pulser or second oscillator 14 to act to cyclically interrupt the high-frequency input pulses to the power switches 3 and 4.

Electrical elements and parts so far described are packaged in a unit 15, the unit being connected to a machining zone 16 constituted by the tool electrode E and the workpiece W which are received in the work tank 9 and supplied with a machining fluid in a usual manner. In accordance with the present invention, a capacitor 17 is connected across the electrode E and the workpiece W immediately adjacent to the machining gap G or in the machining zone 16. A capacitor voltage monitoring circuit unit 18 is connected across conductors 8a and 8b at the power supply portion 15 of the system.

The rectifier 2, switches 3 and 4, transformer 5 and rectifiers 6 and 7 form an AC-DC-HF PULSE inverter which provides high-frequency pulses when the switches 3 and 4 are turned on and off at a high frequency of 1 KHz to 5 MHz of the oscillator 10 output. Desired high-frequency pulses can thus be generated with readiness and high response rate. The pulser 14 is included to cyclically interrupt such high-frequency pulses at a desired frequency and intervals. The transformer 5 transforms the voltage magnitude of the high-frequency output to a sufficient level, say 50 to 5000 volts, at least twice the electrical discharge voltage, such that the capacitor 17 can be charged up with one or two pulses or at most five pulses to a level at which the electrical discharge may be produced.

Locating the capacitor 17 in the direct proximity of the machining gap G to permit it to discharge through shortest possible conductors allows an increase in machining current and efficiency. The capacitor 17 functions to integrate and store at a machining section the pulsed power fed through the feeder 8 from the power supply 15 located remotely therefrom and to discharge an accumulation of several pulses. Since discharges are effected through short conductors of an inductance not greater than 1µH and possibly at most 0.5 µH, machining discharge of an increased efficiency are obtained. The power supply 15 may thus be located even considerably remote from the machining section 16 to allow energy to be delivered through the conductors 8 which may even be very long without adversely affecting the quality of the machining discharges that result. Discharges are capable of occurring without substantial power loss or without waveform distortion and at a desirably increased peak current and frequency.

The high-frequency pulses generated at the power supply 15 in the manner so far described and transmitted over the feeder 8 to the machining zone 16 should have generally a pulse duration ($\tau$on) of 1 to 100 µs and a pulse interval ($\tau$off) of 0.5 to 50 µs, although pulses of a greater duration may sometimes be used, especially in rough machining operations. The capacitor 17 is adapted to be charged with one or more such pulses and then discharged. The pulse charging followed by discharging results in stable machining discharges with less tendency toward arcing or short-circuiting.

Figure 3:
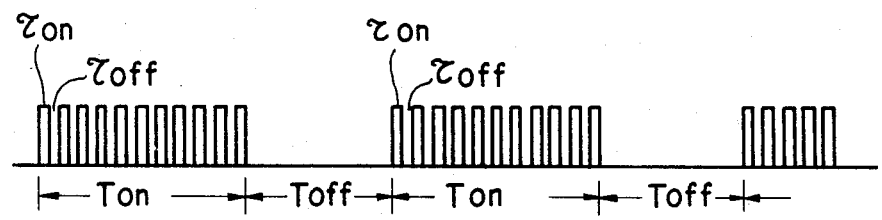
FIG. 3 is a waveform diagram illustrating machining pulses provided across the machining gap in accordance with the embodiments of FIGS. 1 and 2.

The second oscillator or pulser 14 has an operating on-time Ton and off-time Toff which are substantially greater than the duration $\tau$on and interval $\tau$off of the high-frequency elementary pulses. When the thyristers 12 and 13 are operated by the second oscillator or pulser 14, these develop pulse trains which individually consist of elementary pulses of on-time $\tau$on and off-time $\tau$off having a duration Ton with the successive trains being separated by a cut-off time interval Toff as shown in FIG. 3, the pulse trains being transmitted over the feeder 8. The duration Ton and interval Toff of the pulse trains may range from 10 μs to 10 ms depending upon a particular machining condition to be selected and also a particular machining state prevailing in the machining gap G. For example, when the machining state deteriorates, the duration Ton can be narrowed and the interval Toff extended. The duration Ton determines the number of consecutive pulses while the off-time Toff determines the cut-off period for elementary pulses (τon, τoff). The cut-off period Toff enables removal of discharge-produced machining chips and gases from the machining gap, thereby decontaminating the gap and permitting stable generation of a succession of machining discharges with the subsequent series of elementary pulses. Such intermittent pulse cut-off need not be employed sometimes in which case the electrode may be cyclically lifted to intermittently widen the machining gap to permit accumulated machining products to be removed therefrom.

When a short-circuiting condition occurs in the machining gap G, a gap voltage drop that accompanies is sensed by a detector unit 18 which may comprise a Schmitt-trigger circuit or the like threshold element. The detector unit 18 then provides an output signal which acts to terminate the operation of the oscillator 10 thereby halting the supply of high-frequency pulses from the source 15 over the feeder 8. The source output voltage is set at a higher value than that required for normal machining operations. Accordingly, when discharges fail to take place due to an expansion of the machining gap G spacing for any reason, the capacitor 17 may charge up to an excessive high voltage. This can be effectively prevented by provision of the detector circuit 18 which is adapted to respond to the gap voltage build-up. The detector circuit 18 thus has an upper or second threshold level set therein corresponding to a predetermined increase in the gap voltage and is adapted to provide a cut-off signal for terminating the operation of the oscillator 10 when the gap voltage exceeds this threshold value. This allows setting the voltage of supply pulses at an elevated value to enable rapid charging of the capacitor 17 without excessive build-up of the charging voltage and thereby eliminates undesirable surface roughening and machining inaccuracy on the workpiece as are the case in which an excessively high discharge voltage is employed, Furthermore, since the high-frequency oscillator 10 is acted upon to controllingly cut off the supply pulses, a prompt and stable control of the system is attained.

Figure 2:
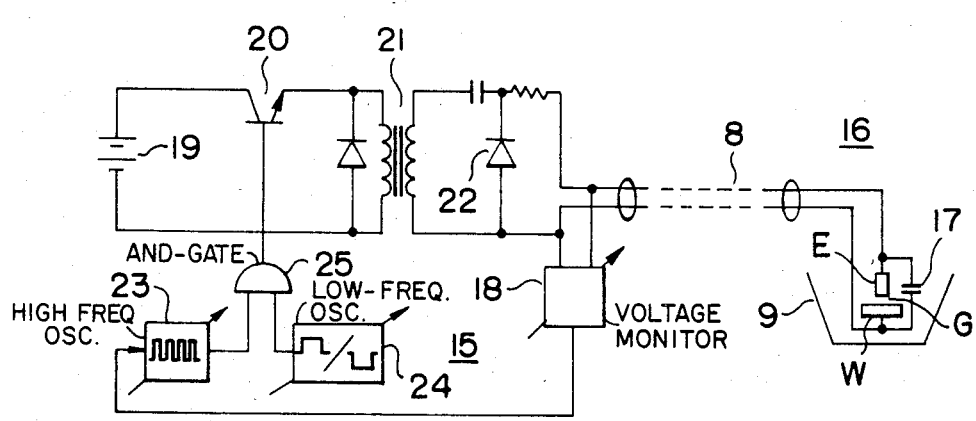
FIG. 2 is a circuit diagram illustrating power supply circuitry in accordance with the invention.

In an arrangement shown in FIG. 2, the pulse supply 15 includes a DC source 19 and a power switch 20. By turning the latter on the off, a series of high-frequency pulses are generated, the pulses being transformed at a transformer 21. The corresponding series of AC pulses developed at the secondary winding of the transformer 21 are converted by a rectifier 22 to DC pulses wich are transmitted via the feeder 8 to the machining system 16 described previously. The switch 20 is turned on and off by a pulser comprising a high-frequency oscillator 23 and a low-frequency oscillator 24 which are combined at an AND gate 25 having an output terminal fed to the base of the switch 20 so that pulse trains as shown in FIG. 3 and described earlier are produced at the output of the supply 15 and fed to the capacitor 17 of the machining system 16. In this embodiment, the transformer 21 is advantageously a step-up transformer to allow the voltage level of the DC source 19 to be sufficiently low so that the switch 20 can be operated under low voltage conditions.

The embodiments of the present invention are capable of achieving machining operations at an increased efficiency or with an increased removal rate for a given surface roughness. For example, in machining a S55C workpiece with a conventional capacitor-type power supply, the removal rate to achieve a surface roughness of 5 μR was at most 0.02 gr/min. In comparison, a removal rate as high as 0.12 gr/min is attained according to the invention to obtain machining with the same roughness. Also, a surface roughness of 10 μRmax is attained with the conventional system at a removal rate of 0.1 to 0.15 gr/min and with the present invention at about 1 g/mm which represents 10 times increase.

Figure 4:
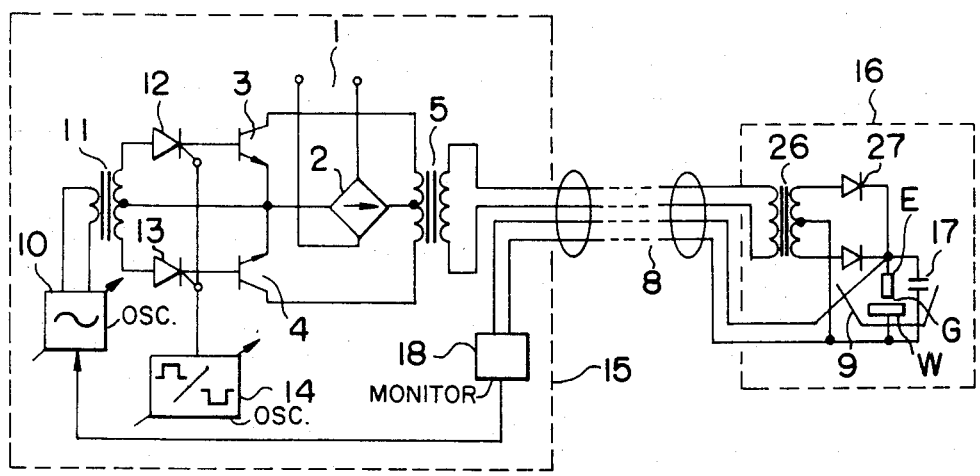
FIG. 4 is a circuit diagram illustrating a modified embodiment of the present invention.

In an embodiment of FIG. 4, the secondary winding of the transformer 5 in the power supply portion 15 is connected through a feeder line or cable 8 to a primary winding of an insulating transformer 26 provided in the machining portion 16 of the electrical machining system. The secondary winding of the transformer 26 has a pair of rectifiers 27 adapted to provide unidirectional pulses for charging the capacitor 17 connected across the tool electrode E and the workpiece W. The capacitor 17, rectifiers 27 and the transformer 26 are connected in the direct proximity of the machining gap G. The cable 8 connecting the power-supply portion 15 and the machining portion 16 is preferably a coaxial cable or feeder providing less loss in power in a high frequency range.

Figure 5:
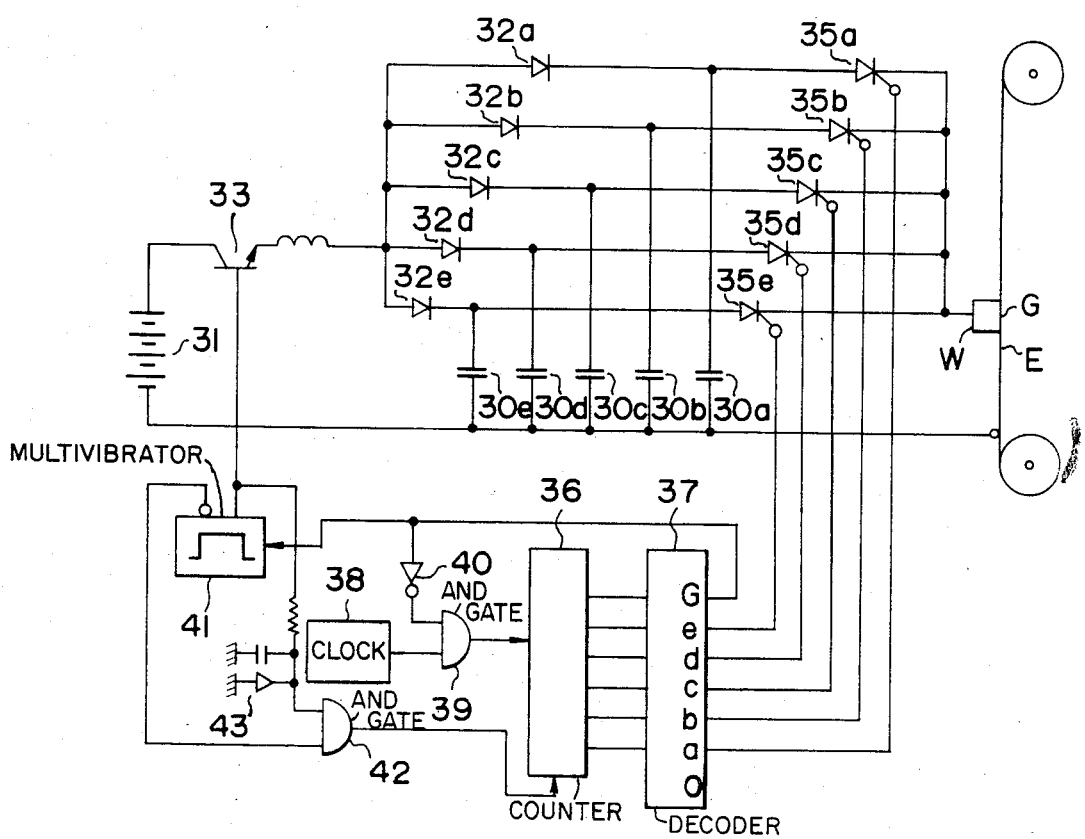
FIG. 5 is a circuit diagram of power supply circuitry of the present invention utilizing a plurality of capacitors.

In FIG. 5, there is shown a further embodiment of the present invention in which a plurality of capacitors 30a, 30b, 30c, 30d and 30e are used for successive discharging across a machining gap G between the tool electrode E and the workpiece W. The capacitors 30a, 30b, 30c, 30d, and 30e are adapted to be charged from a common DC source 31 via rectifiers or diodes 32a 32b, 32c, 32d and 32e, respectively, when a transistor switch 33 is rendered conductive. The capacitors 30a, 30b, 30c, 30d and 30e are adapted to be discharged across the machining gap G successively when thyristers 35a, 35b, 35c, 35d and 35e are successively turned on. In the illustrated system, the tool electrode E is an elongated or wire-like electrode continuously transported from a supply reel to a take-up reel and the workpiece W is juxtaposed with the traveling wire electrode for machining thereby and is displaced relative thereto along a prescribed cutting path.

A system for operating the transistor 33 in the charging circuit and the plurality of thysisters 35a to 35e in the discharging circuit includes a counter 36, a decoder 37 and a clock or time base 38. When the thyristers 35a to 35d in the discharging circuit are successively turned on and off by these elements, a succession of high-frequency control pulses are generated.

An AND gate 39 fed into the counter 36 has a first input led from the time base 38 and a second input having a NOT gate or inverter 40 led from the decoder 37. The output of the decoder 37 which leads into the inverter 40 is also fed to a one-shot multivibrator 41 designed to operate the switch 33 in the charging circuit at a relatively low frequency. The multivibrator 41 is connected with the counter 36 via an AND gate 42 which provides a clear signal every time the one-shot signal is provided. The latter signal is provided via a delay circuit 43.

The switch 33 is turned on to charge the capacitors 30a, 30b, 30c, 30d and 30e. After charging, the capacitors 30a to 30e are discharged when the switches 35a to 35e are turned on. The counter 36 counts pulses from the time base 38 so that signals successively develop at outputs a, b, c, d, and e of the decoder 37. Initially, an output pulse which develops at the terminal a renders the switch 35a conductive permitting the capacitor 30a to be discharged across the wire electrode E and the workpiece W. Then, the b terminal output pulse renders the switch 35b on permitting the capacitor 30b to be discharged. Likewise, by their turn the terminals c, d, and e are actuated, the switches 35c, 35d and 35e turned on and the capacitors 30c, 30d, and 30e discharged. When all the capacitors 30a to 30e are discharged, the terminal g of the decoder 37 develops a signal to actuate the one-shot multivibrator 41 and at the same time to disable the timing signal to the counter 36 through the AND gate 39.

The multivibrator 41 provides a low-frequency pulse to render the charging switch 33 conductive to cause capacitors 30a, 30b, 30c, 30d and 30e to be charged. The charging time is determined by the duration of this pulse which is set at the multivibrator 41. When the pulse terminates, the AND gate 42 is enabled so that the counter 36 is cleared. When this occurs, the output at the terminal g of the decoder 37 disappears to enable the AND gate 39 permitting the counter 36 to commence counting clock pulses from the time base 38. At this time, the charging switch 33 has been already off to isolate the capacitors 30a to 30e from the charging source 31.

The counter 36 commences counting up from zero and, depending upon numbers counted, there appears a signal pulse successively at the terminals a, b, c, d, and e of the decoder 37 to turn the switches 35a, 35b, 35c, 35d and 35e on by their turns so that the capacitors 30a, 30b, 30c, 30d and 30e are successively discharged. Since the time base 38 oscillates at a high frequency to provide high-frequency pulses which are applied from the counter 36 and decoder 37 to the switches 35a to 35e successively, the successive discharging by the capacitors 30a to 30e is effected at a high frequency.

A stabilized production of machining pulses is thus achieved by a conjugate operation of the charging switch 33 and the discharging switches 35a to 35e. It will be seen that the charging switch 33 is held off while the capacitors 30a to 30e are discharging and the switches 35a to 35e are held off while the capacitors 30a to 30e are charging.

Figure 6:
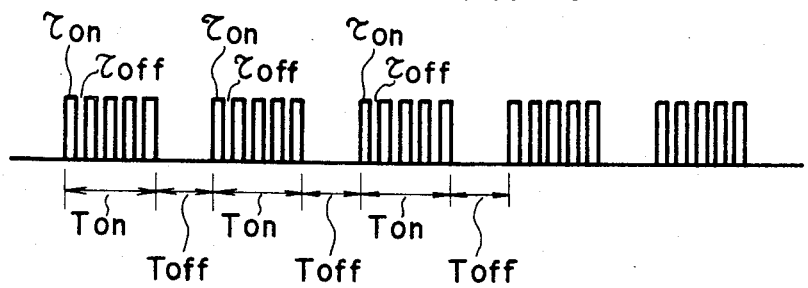
FIG. 6 is a waveform diagram illustrating machining pulses resulting from the use of the system of FIG. 5.

In FIG. 6 there is shown a waveform of machining pulses resulting from the operation of the system of FIG. 5. It is seen that pulses appear as pulse trains. In each train, five machining pulses are seen which result from capacitors 30a, 30b, 30c, 30d and 30e discharging. The machining pulses have a duration determined by the capacitors which are equalized in capacitance and discharge characteristic and a pulse interval $\tau$off which can be set at the oscillator 38, the counter 36 and the decoder 37. As noted previously, individual pulses in each train constitute elementary or unit machining pulses which can effectively be controlled in group or train with a duration Ton and an interval Toff. Of course, increasing the number of capacitors provides an increased number of elementary pulses to be included in each train Ton. A modified waveform of pulse trains can be obtained using capacitors 30a to +e with varying capacitances and discharge characteristics. The train interval Toff is determined by the charging time, i.e. the time in which the switch 33 is held on and which can be set at the multivibrator 41. The duration $\tau$on and interval $\tau$off of elementary pulses may range generally 1 to 100 μs while the duration Ton and interval Toff of pulse trains may range 10 to 100 ms.

With cyclically interrupted trains of elementary pulses that are repetitively created at a high frequency with a fine duration $\tau$on and a fine interval $\tau$off in each train Ton and delivered to the machining gap G formed between the wire electrode E and the workpiece W, the latter can be machined electroerosively with an enhanced efficiency, i.e. with an increased removal rate, an improved surface roughness and a reduced relative electrode wear. Furthermore, the cyclic interruption of elementary pulses permits machining discharges to be created with an increased peak current Ip and this also contributes to enhancement of the removal rate. Since each train Ton of elementary pulses is followed by a cut-off period Toff, the machining chips, tar and gases accumulated as a result of succession of machining elementary discharges are effectively carried away from the gap G during that period to render the gap G suitable for reception of the subsequent train of elementary pulses so that machining may be carried out with stability. Also, an accidental short-circuiting or arcing that may occur in an elementary pulse train can effectively be interrupted in the cut-off period which follows.

Figure 7:
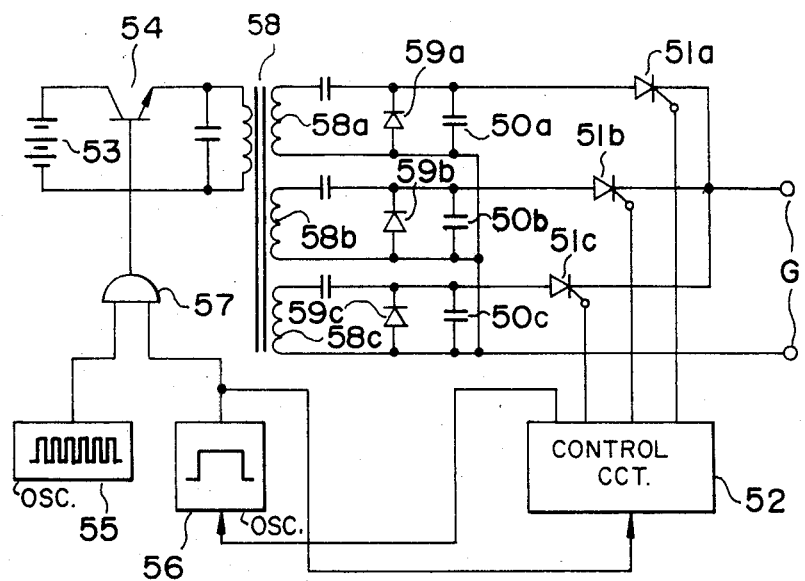
FIG. 7 is a circuit diagram illustrating a modification of the circuit arrangement of FIG. 5.

In an arrangement shown in FIG. 7, a plurality of capacitors 50a, 50b, 50c, 50d and 50e are shown connected in parallel with one another across the machining gap G via thyristers 51a, 51b and 52c, respectively as in the previous embodiment of the invention, the thyristers, 51a to 51c being successively turned on by a control circuit 51 to discharge the capacitors 50a to 50c successively. In this embodiment, the charging system for the capacitors 50a to 50c comprises a DC supply 53 that may be a rectified output of a commercial AC as in the previous embodiment. The DC output 53 has a power switch 54 periodically turned on and off by a control circuit consisting of a high-frequency oscillator 55 and a low-frequency oscillator 56 which are combined at an AND gate 57 fed to the control electrodes of the switch 54. Consequently, low-frequency pulse trains individually consisting of high-frequency pulses develop at the primary winding of a transformer 58 and are transformed into AC pulse trains which appear at three secondary windings 58a, 58b and 58c of the transformer 58. The low-frequency AC pulse trains consisting of high-frequency AC pulses induced at each of the secondary windings 58a, 58b and 58c are individually converted by rectifier or diodes 59a, 59b and 59c, respectively, into a low-frequency DC pulses for charging capacitors 50a, 50b and 50c. During the time period in which capacitors 50a, 50b and 50c are being charged, the switches 51a, 51b and 51c in their respective discharging networks are held off.

Upon completion of the predetermined charging time which is set at the low-frequency oscillator circuit 56, the output of the gate 57 is turned to "O" to render the switch 54 off. At this instant, the circuit 56 provides a trigger signal which actuates the pulser 52 to turn on the thyristers 51a, 51b and 51c successively thereby causing the capacitors 50a, 50b and 50c to be discharged in succession. When the discharging ends, a signal is fed back to the pulser 56 to render the switch 54 operative to allow charging of capacitors 50a, 50b and 50c. With repetition of charging and discharging of capacitors 50a to 50c in this manner, machining pulse trains (Ton, Toff) individually consisting of elementary pulses ($\tau$on, $\tau$off)

as substantially shown in FIG. 6 are produced across the machining gap. In this particular arrangement, it will be seen that each train contains three elementary pulse and the number of capacitors for simultaneous charging and successive discharging can be increased to provide the correspondingly increased number of elementary pulses in each train.

The embodiment of FIG. 7 which makes use of a DC-HF-DC or AC-DC-HF-DC inverter arrangement is particularly advantageous in that the charging voltage for capacitors can be controlled as desired and can be increased at a higher level to allow an accelerated charging of the capacitors. Furthermore, the inverter controlled at an elevated frequency provides an exceptionally high response to permit the repetition rate of pulse trains to be increased as desired.

Figure 8:
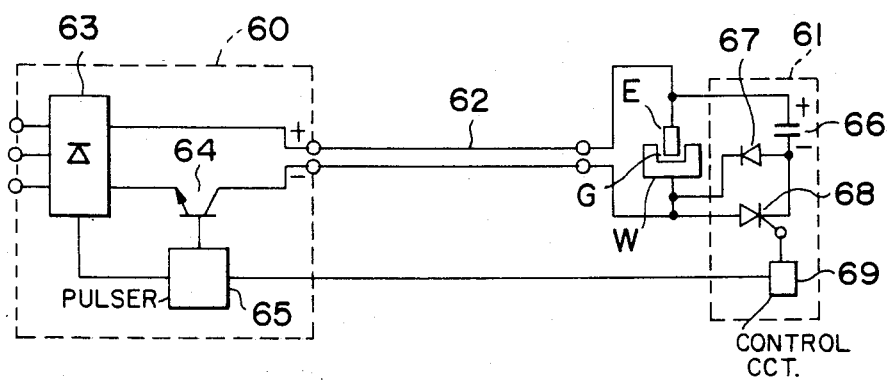
FIGS. 8 and 9 illustrate further embodiments of the invention.

In FIG. 8 there is shown a modification of power-supply previously described. In this embodiment as well, the circuitry comprises a source portion 60 and a machining portion 61, the latter locating in the proximity of the machining gap G formed between the tool electrode E and the workpiece W while the former being located remote from the machining gap G and connected with the latter via a high-frequency feeder 62. The source portion 60 has a rectifier 63 for converting a commercial AC input into a DC output which is pulsed by a switch 64 operated by an oscillator or pulser 65 to provide high-frequency DC pulses. The high-frequency DC pulses are transmitted over the feeder 62 to feed the machining portion 61. The machining portion 61 includes a capacitor 66 adapted to be charged with the high-frequency pulses via a rectifier or diode 67. In this embodiment, the capacitor circuit also includes a thyrister 68 which when turned on by a control circuit 69 acts to discharge the capacitor 66 across the machining gap G between the tool electrode E and the workpiece W. The control circuit 69 is connected with the oscillator or pulser 65 for controlling the power switch 64 in the source portion 60.

Since the capacitor 66 is located in the proximity of the machining gap G with conductors of a minimum length therebetween, the discharge current may have an increased peak value Ip. Generally, the peak current Ip can be expressed by $$Ip = V\sqrt{\frac{C}{L}}$$

whereas the duration of discharge pulse can be expressed by $$\tau = \sqrt{LC}$$

where V is the charging voltage for the capacitor 66, C the capacitance of the capacitor 66 and L the inductance in the capacitor discharge circuit. In the present arrangement in which the length of the capacitor discharge circuit is minimized, it is found that the inductance L can be at most 1 $\mu$H and as actually measured is as low as 0.3 $\mu$H. Thus,
when C=1.5 $\mu$F, L=0.3 $\mu$H and V=90 volts, then, $\tau$=0.7 $\mu$sec and Ip=200 A
where C=1.0 $\mu$F, L=0.3 $\mu$H and V=90 volts then, $\tau$=0.5 $\mu$sec and Ip=150 A
when C=0.5 $\mu$F, L=0.2 $\mu$H and V=90 volts, then, $\tau$=0.3 $\mu$sec and Ip=140 A It is seen, therefore, that by using the capacitor immediately in the vicinity of the machining gap G, a transformation of the waveform of machining pulses transmitted from the source portion 60 can be attained to provide an increased peak current.

The operating frequency of the control circuit or oscillator 69 may range generally between 1 and 10 kHz. With the oscillator 69 operated synchronously with the oscillator 65, the transformation of waveform can be accomplished with respect to all pulses supplied from the source portion 60 to create a succession of machining discharges of increased peak current across the machining gap G. Also, the switch 68 can be turned on and off at a frequency lower than the frequency of source pulses to provide a machining pulse train of cyclically increased amplitude. When the capacitance of the capacitor 66 is sufficiently small, there results a train of pulses having pulses of an increased amplitude cyclically superimposed thereon.

According to experiments, a series of source pulses of a peak voltage of 90 volts, a pulse duration of 20 $\mu$sec and a peak current of 50 amperes are transmitted from the supply portion 60 over the feeder 62 to charge the capacitor 66 of 1 $\mu$F and cause it to discharge across the machining gap through a discharge circuit of 0.3 $\mu$H with the switch 69 operated synchronously with the switch 64 in the supply portion 60. It has been found that removal rate for an iron workpiece W with an iron electrode E is tripled compared with the case in which the capacitor 66 is not provided and relative electrode wear is then improved from 18% to 3%. It is shown that the use of a cpacitor disposed immediately in the proximity of the machining gap G and discharge-controlled markedly enhances removal rate.

Figure 9:
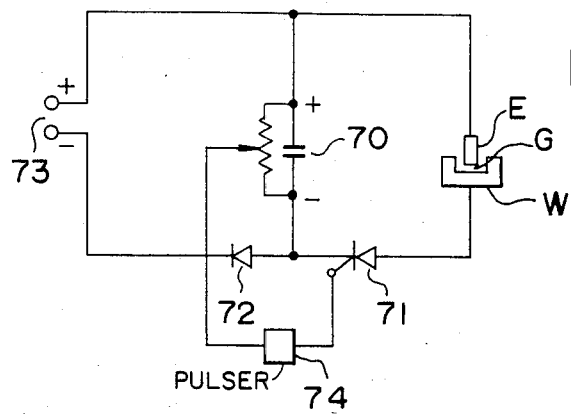

In a modification of FIG. 9, a capacitor 70 is connected to the machining gap G by a switch 71, e.g. a thyristor, and fed by the pulse-voltage source 73 via a rectifier with unidirectional-current conducting element 72.

Accordingly, in this embodiment, all discharges are produced at the machining gap G exclusively from the capacitor discharge of the capacitor 70. No gap discharge occurs directly via a source voltage pulse.

Thus in this modification a pulser 74 is responsive to the charging voltage on the capacitor 70 and is adapted to trigger the switch 71 into conduction every time the capacitor 70 is charged to a preset voltage level thereby permitting a discharge to be generated across the machining gap.

In this circuitry as well, by setting the capacitance of the capacitor 70 with respect to the input energy of pulses supplie from the source 73 so as to cause the capacitor 70 to charge and discharge for every supply pulse, there is applied at the gap G a succession of machining discharges of an increased pulse peak current to allow an increased removal rate.

Figure 10:
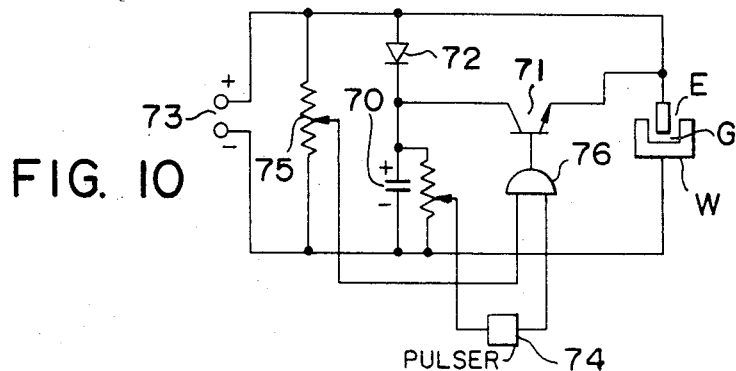
FIGS. 10 to 12 illustrate further modifications of the system illustrated in FIGS. 8 and 9.

In a modification of FIG. 10, source pulse voltage is sensed by a sensing resistor 75 to provide a sensing signal which is combined at an AND gate 76 with an output of the oscillator 74 operated in response to the charging voltage on the capacitor 70 to control the power switch 71. Thus, only when the pulse supply 73 furnishes source pulses is the switch 71 allowed to be turned on to discharge the capacitor 70. In this embodiment, discharge current across the machining gap comprises a source pulse and a capacitor discharge pulse superimposed thereon. By regulating the phase difference at the pulser 74, the timing of the capacitor 70 discharging can be controlled as desired.

Figure 11:
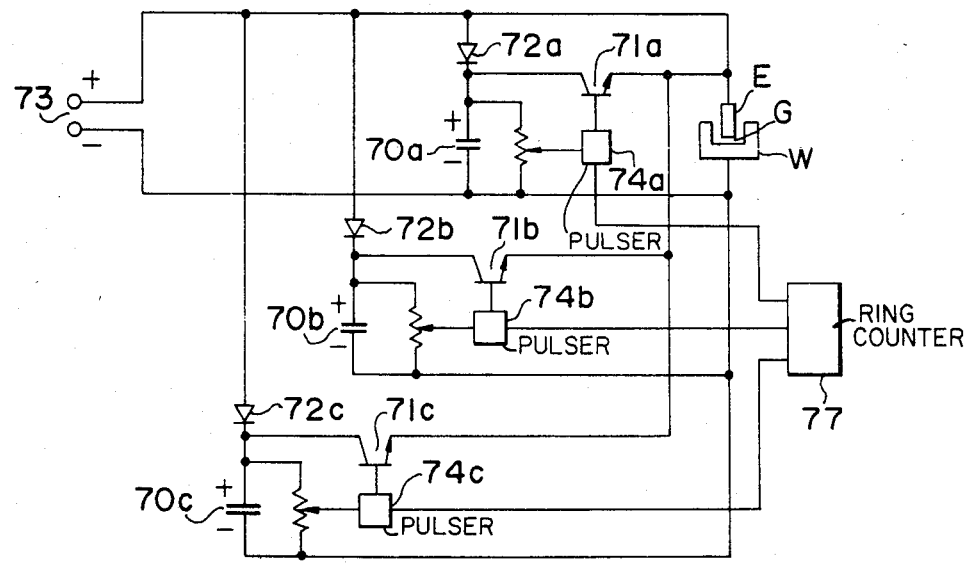

In a modification of FIG. 11, a plurality of capacitors 70b and 70c are used in conjunction with corresponding switches 71a, 71b and 71c and corresponding pulsers 74a, 74b and 74c, the latter being operated by a ring-counter circuit 77 to effect successive discharging of the capacitors 70a to 70c.

Figure 12:
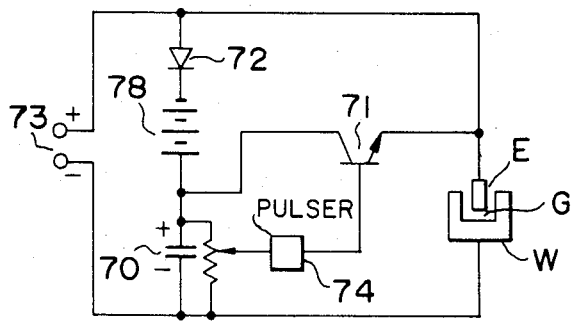

In a modification of FIG. 12, an auxiliary voltage source 78 is provided in series with the pulse supply 73 to accelerate charging of the capacitor 70 to allow its termined voltage to build up to a level substantially higher than a machining voltage.

There is thus provided an improved capacitor-type high-frequency power supply for electrical machining which is superior in machining performance and efficiency.

What is claimed is:

1. A capacitor-type power supply for electrical machining, comprising:
   a gap circuit disposed in the vicinity of a machining gap and including a capacitor connected across said machining gap via conductors of a minimum length;
   a high-frequency power generator disposed remote from said machining gap for providing a high-frequency electric power at an output thereof; and
   a feeder for connecting said output of said power generator with said gap circuit to permit said capacitor to be charged pulsively with said high-frequency electric power and to be discharged through said machining gap via said conductors of a minimum length to produce machining pulses at said machining gap, said conductors having a stray inductance not greater than 1 microhenry, said minimum length and said vicinity of said machining gap and said stray inductance being such that the conductors leading to said gap are free from significant loss of power and that the wave form of each of said machining pulses is substantially free from distortion, said gap circuit including a rectifier disposed in said vicinity to said machining gap and connected with said capacitor for rectifying the charging current therefor.

2. The power supply defined in claim 1 wherein said capacitor is connected to said machining gap to form a discharge circuit therewith having an inductance not greater than 1 microhenry.

3. The power supply defined in claim 2 wherein said inductance is not greater 0.5 microhenry.

4. The power supply as defined in claim 1, further comprising means for detecting the voltage across said machining gap to produce a gap monitoring signal and means connected between said detecting means and said high-frequency power generator for rendering said output of the generator inoperative upon said gap monitoring signal traversing a predetermined level.

5. The power supply defined in claim 1 wherein said rectifier has an output voltage at least twice the voltage to which said capacitor is chargeable with a single pulse of said high-frequency power, said capacitor being adapted to integrate and store a plurality of pulses of said high-frequency power and to discharge an accumulation of said plural pulses through said machining gap to produce each of said machining pulses.

6. The power supply defined in claim 1 or claim 5 wherein said gap circuit further includes a switch disposed in said vicinity of said machining gap and connected to said capacitor for controlledly discharging the charge thereon through said machining gap.

7. The power supply as defined in claim 1 wherein said generator has an output voltage at least twice the voltage to which said capacitor is chargeable with a single pulse of said high-frequency power, said output voltage being such that said capacitor is charged with a plurality of pulses of said high-frequency power to integrate and store said plural pulses, followed by discharging of an accumulation of said plural pulses through said machining gap to produce each of said machining pulses.

8. The power supply defined in claim 1, claim 4 or claim 7 wherein said generator is adapted to provide pulse trains individually consisting of elementary pulses of a frequency in the range between 1 kHz and 5 kHz, the adjacent trains of the elementary pulses being separated by a cut-off interval.

9. The power supply defined in claim 8 wherein said generator has said interval variably adjusted in accordance with a desired machining condition.

10. The power supply defined in claim 8 wherein said generator has said interval modified in response to the state of the machining gap.

11. The power supply defined in claim 1 wherein said generator has an output frequency in the range between 1 kHz and 5 MHz.

12. The power supply defined in claim 1 wherein said generator comprises input means for receiving a commercial alternating current to a direct current, means for pulsing said direct current to produce a high-frequency alternating current of pulsed output at a frequency much higher than that of said commercial alternating current and a transformer for transforming the voltage magnitude of said high-frequency output to a desired voltage level of said high-frequency power.

13. The power supply defined in claim 12 wherein said generator further comprises a rectifier connected to an output winding of said transformer and to the input side of said feeder for providing a succession of unidirectional high-frequency pulses constituting said high-frequency power.

14. The power supply defined in claim 13 wherein said unidirectional high-frequency pulses of said desired voltage level have at least twice the voltage to which said capacitor is chargeable with a single pulse of said unidirectional high-frequency pulses, said capacitor being adapted to integrate and store a plurality of said unidirectional high-frequency pulses and to discharge an accumulation of said plural pulses through said machining gap to produce each of said machining pulses.

15. The power supply defined in claim 12 wherein said gap circuit includes a transformer disposed in said vicinity of the machining gap and having a primary winding connected to the output side of said feeder and a secondary winding connected to said capacitor via rectifier means disposed in said vicinity of the machining gap to provide a succession of unidirectional high-frequency pulses for pulsively charging said capacitor, the input side of said feeder being connected to an output winding of the first-mentioned transformer.

16. The power supply defined in claim 15 wherein said unidirectional high-frequency pulses have a voltage of at least twice the voltage by which said capacitor is chargeable with a single pulse of said unidirectional high-frequency pulses, said capacitor being adapted to integrate and store a plurality of said unidirectional high-frequency pulses and to discharge an accumulation of said plural pulses through said machining gap to produce each of said machining pulses.

17. The power supply as defined in claim 1 wherein said gap circuit includes a rectifier disposed in said vicinity of said machining gap and connected with said capacitor for rectifying the charging current therefor.

18. The power supply defined in claim 1 wherein said gap circuit includes a switch disposed in said vicinity of said machining gap and connected with said machining gap.

* * * * *

UNITED STATES PATENT AND TRADEMARK OFFICE
CERTIFICATE OF CORRECTION

PATENT NO. : 4,516,009
DATED : 7 May 1985
INVENTOR(S) : Kiyoshi INOUE

It is certified that error appears in the above-identified patent and that said Letters Patent is hereby corrected as shown below:

In the heading, left column, item [30], the second Foreign Application Priority Data number should read:

-- 53-73446 --.

Signed and Sealed this

Twenty-seventh Day of August 1985

[SEAL]

Attest:

DONALD J. QUIGG

Attesting Officer          Acting Commissioner of Patents and Trademarks